Dec. 2, 1952  F. ZENZ, SR  2,619,731
AXLE ALIGNMENT GAUGE
Filed June 7, 1949
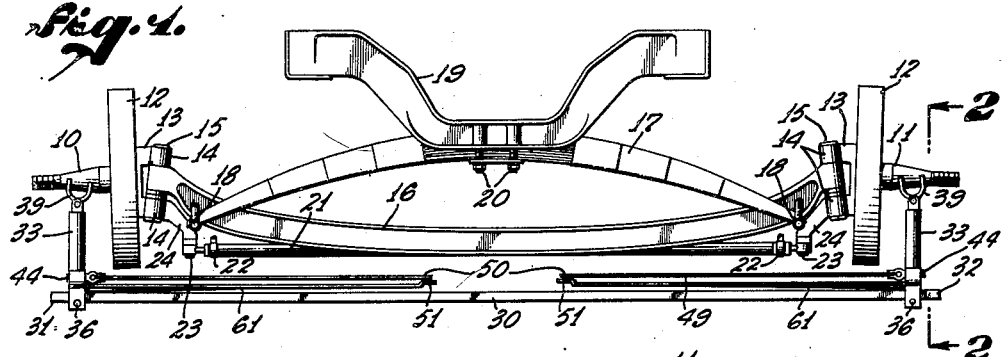
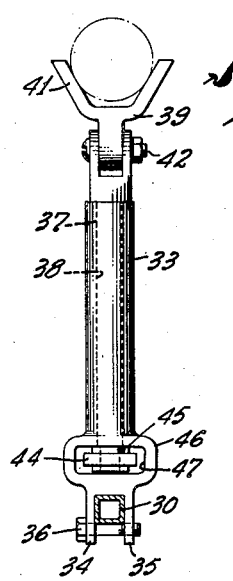
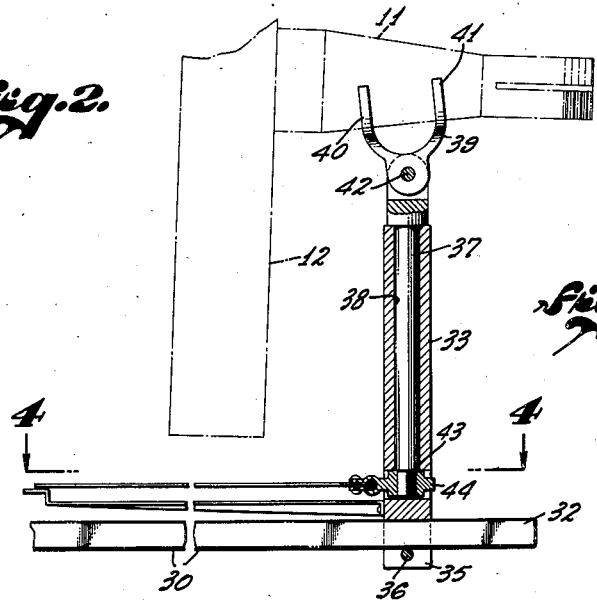
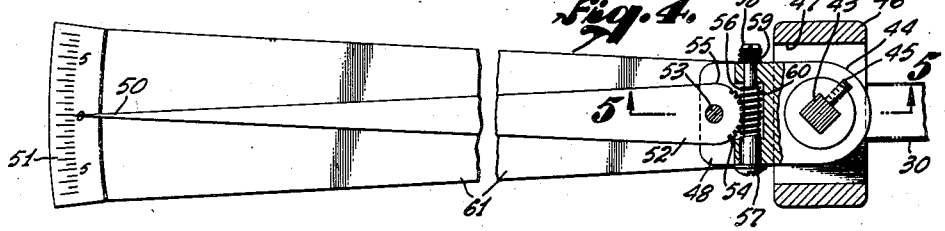
FRANK ZENZ, SR.
INVENTOR.
HUEBNER, BEEHLER, WORREL,
HERZIG & CALDWELL,
ATTORNEYS.

Patented Dec. 2, 1952

2,619,731

UNITED STATES PATENT OFFICE 2,619,731

AXLE ALIGNMENT GAUGE

Frank Zenz, Sr., San Fernando, Calif.

Application June 7, 1949, Serial No. 97,548

4 Claims. (Cl. 33—193)

1

The invention has reference to gages and particularly gages of the type used by mechanics for making a determination of the degree of misalignment of the axles of motor vehicles.

To appreciate the necessity for employment of a gage of the type herein concerned and the advantage inherent in a gage which is inexpensive and easy to use, it is helpful to have some acquaintance with the design of the undercarriage of a motor vehicle upon which the wheel axles are carried. The gage here involved is one adapted particularly for use in aligning separate and independent axles on opposite sides of the undercarriage. This ordinarily means the front axles or steering axles. Motor vehicles invariably are designed so that the vehicle is steered by manipulation of the front wheels. To this end each wheel is mounted by a knuckle joint to the undercarriage or chassis. The axles are connected together only by means of the steering apparatus so that both are turned simultaneously. To properly manipulate the vehicle it is important, however, that both axles be in precise axial alignment with each other under operating conditions. Circumstances arise, however, which tend to misalign the axles as, for example, one wheel of the vehicle being driven with considerable force against some obstacle. Misalignment of one or both wheels makes steering extremely difficult, makes the vehicle hard to manipulate and produces considerable deterioration in the tires because of uneven wear. Misalignment of the wheels even by a very small amount is objectionable; consequently, there frequently falls upon the maintenance mechanic the problem of checking wheel alignments for realignment purposes.

Because of the relatively great span of the axles on opposite sides of automobiles and their relative inaccessibility, suitable inexpensive gages for testing or measuring the alignment have not been available. While it is true that certain types of gages have been designed and employed, these to a very large extent have been large, cumbersome and particularly expensive. It appears that the precision of measurement necessary to the correct alignment of wheels sought to be obtained in the past has depended upon a construction of great strength and weight. While it is further true that these wheel alignment gages heretofore used have been sufficiently precise, it is true on the other hand that because of their construction they have been so expensive that the average mechanic capable of doing a wheel alignment job has not been in a position to afford the expense involved in the purchase of available gages to test his work.

It is therefore among the objects of the invention to provide a new and improved axle alignment gage which is inexpensive to build and which is relatively light in construction and therefore easy to use.

Another object of the invention is to provide a new and improved axle alignment gage which is constructed of relatively few parts, simply assembled but at the same time adjustable to an extent that the gage may be successfully used for testing the alignment of axles spaced one from another at varying distances, greater or lesser than the average wheel spacing.

Still another object of the invention is to provide a new and improved axle alignment gage which is easy and convenient for the average mechanic to read and which can be moved circumferentially about the axles to any one of a number of different positions so that the alignment or misalignment can be read on the gages in any one of many different positions.

Still further among the objects of the invention is to provide a new and improved gage construction for the production of axle alignment gages which is so designed that the separate parts going into the makeup of the gage can be standard parts having no more than ordinary commercial tolerances and wherein when parts are machined the tolerances are sufficiently easy to permit the device to be built rapidly and without extreme skill, the precision necessary, however, being maintained by the provision of special features, the adjustment of which can be depended upon to counteract and correct inaccuracies of the type ordinarily encountered in inexpensive manufacturing or machining methods.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is an end view of the undercarriage of the forward end of a motor vehicle showing separate left and right front axles to which the front wheels of the vehicle are ordinarily attached.

Figure 2 is a side elevational view taken on the line 2—2 of Figure 1.

Figure 3 is a front elevational sectional view showing the construction of the gage on one side of the vehicle.

Figure 4 is a plan view partially in section of one side of the gage taken on the line 4—4 of Figure 3.

Figure 5 is a fragmentary elevational sectional view taken on the line 5—5 of Figure 4.

In the embodiment chosen to illustrate the invention there is shown in Figure 1 some of the elements of the forward wheel system of a motor vehicle or automobile to which the gage may be applied. While some details have been omitted for the sake of clarity, there are shown, however, wheel axles 10 and 11 on opposite sides of the vehicle and the attendant structure therebetween necessary for the support of the axles. Each axle in turn bears a brake drum 12 and a knuckle joint 13, portions 14 of which are mounted by means of a pin 15 to a beam 16 designed to carry the weight of the vehicles upon the wheel. As further shown in Figure 1 a leaf spring 17 is supported at points 18 upon the beam and upon the center of the leaf spring in turn a portion 19 of the vehicle chassis is bolted by means of bolts 20 and comprises a means of transferring the load of the vehicle to the wheels.

Further by way of explaining the structure having a bearing upon the employment of the tool or gage comprising the invention, there is shown a steering rod 21 at the ends of which are provided adjustable connections 22 attached by suitable hinges 23 to a steering knuckle 24 which is in turn connected to the structure which carries the axle 10 or 11, as the case may be.

It is the intent and purpose of the novel adjusting gage herein shown and described to make it possible for the mechanic to determine the degree of alignment or misalignment of the axle 10 with respect to the axle 11 and vice versa.

The gage consists essentially of a beam 30 which extends from one side to the other of the motor vehicle and is of such length that ends 31 and 32 extend sufficiently outwardly beyond the wheel axles so that axles spaced at a maximum distance apart may be accommodated by the device. The same arrangement has in it the inherent capacity of adjustment to accommodate axles for wheels spaced the minimum distance apart.

For convenience the beam 30 may be rectangular or even square in cross-section and hollow within so as to produce a beam of relatively great strength but which at the same time is comparatively light in weight.

At each end of the beam there is provided a transverse extension 33 here shown as including independent side elements 34 and 35 adapted to straddle the beam and to be held in position on the beam by means of a bolt 36. It will be obvious from an examination of Figures 2 and 3 that the position or location of extensions 33 on the beam can be changed by loosening the bolt 36 following which the extensions may be adjusted outwardly or inwardly and the bolt thereafter tightened in place in order to hold the extension in its predetermined position of adjustment. Moreover by the employment of a noncircular beam, here shown as rectangular in cross-section, the extension 33 is incapable of rotation about the beam and therefore the extensions 33 on opposite ends of the beam cannot become misaligned one with respect to the other.

In order further to accommodate the axle, which may in many circumstances have a tapered outline, there is provided within the extension 33 a swivel post 37 preferably round and adapted to swivel freely within a cylindrical interior 38 of the extension 33.

The swivel post, however, is of special construction to the end that it employs mounted on the free or outer end thereof an axle-engaging fork 39, one tine 40 of which is located at the inward end of the axle 11 and the other tine 41 of which is located nearer the outward end of the axle. The fork is so constructed that it is connected to the swivel post by means of a pin 42 which penetrates the swivel post transversely and in a direction which permits the fork to tilt so as to accommodate the conical exterior of the axle.

At the bottom of the swivel post 37 there may be supplied a squared section 43 comprising a gage connection element to which a pointer block 44 is secured. The pointer block may employ a set screw 45 for the purpose of attaching the pointer block to the squared section 43 of the post 37. It should be noted in this connection that the extension 33 at the point adjacent the attachment of the swivel block has an enlarged portion 46 with an opening 47 at the side thereof facing inwardly along the axis of the beam 30.

The pointer block itself contains in addition to the aperture adapted to slide over the squared section 43 a milled or otherwise formed slot 48, the general proportion of which may perhaps best be ascertained from an inspection of Figure 5. The plane of the pointer block is transverse to the axis of the post and is usually used in generally horizontal position.

To make it possible to read the alignment condition of the wheels on the gage there is provided a pointer 49, an outer pointed end 50 of which overlies a scale 51 bearing suitable calibrations. The pointer has at a butt end 52 a portion substantially greater in cross-section, although not varying appreciably in thickness. As illustrated in greater detail in Figures 3 and 4 the butt end 52 is held in place within the slot 48 by means of a rivet 53. The pointer is therefore adapted to swivel or rotate about the rivet 53 as a center.

Since the pointer would be ineffective unless set positively in a zero position, means is provided for adjusting the pointer in proper relation to the pointer block with which it acts as a unit. This is accomplished by providing a series of teeth 54 in arcuate alignment around a curved surface 55 at the butt end of the pointer. The center of the arc is preferably the center of the rivet 53.

In order to swing the pointer to a proper position of adjustment there may be provided a worm wheel 56 adapted to mesh with the teeth 54. The worm wheel is made preferably a part of an adjusting screw 57 which extends laterally across the pointer block and is held in place by means of a lock nut 58 and spring 59. The pointer block is specially recessed as at 60 in order to accommodate the worm wheel just described. The scale 51 hereinabove described may be carried by an arm 61 which in turn is fixed in position beneath the pointer by means of being attached through a bracket 62 to the inwardly facing portion of the extension 33.

A more careful examination of the structure herein described will reveal that the parts need not be made to a fine degree of skill and tolerance. A free fit of the squared portion 43 of the post 37 is sufficient to permit it to slide within an appropriate squared aperture 64 of the pointer block. The thickness of the butt end 52 of the pointer need not be finely dimensioned so long as it can freely swing within the slot 48 provided for it in the pointer block.

The tip or pointed end 50 of the pointer must, however, be maintained in a precise position with respect to the position of rotation of the post 37, inasmuch as this is the portion of the device which is depended upon to accurately measure or gage the alignment of the wheel axles. Here again, although the initial tolerances may be relatively wide and free, it is possible upon assembly of the device to precisely zeroize the position of the pointed end 50 of the pointer upon the scale 51 when the axle 11, for example, is in precisely correct alignment.

The zeroizing is accomplished by the worm wheel 60 adapted to be rotated by the bolt 57 when a screw driver is inserted in the screw driver slot at the head of the bolt. The spring 59 holds the bolt in any predetermined position of adjustment. Convenient zeroizing means may be provided as, for example, the provision of a continuous straight axle to which the gage herein described may be applied and the pointers then separately and properly adjusted end to end with respect to each other by suitable manipulation of the worm wheels 60. Thus the parts although initially manufactured by methods not ordinarily classified as precise can, nevertheless, be adjusted with extreme precision so that the gage can be depended upon for precise measurements. Furthermore, by this same simple device the pointers can be realigned easily and effectively at any time should they become mishandled or otherwise get out of adjustment.

It will be appreciated that the degree of misalignment of the axles 10 and 11 is usually relatively little but if there is misalignment of any kind it is important to eliminate it. The device herein described is so constructed that a slight movement of the butt end 52 results in a relatively wide swing of the pointed end 50. Movement of the pointed end 50 results from rotation of the post 37 when the fork 39 engages an axle which is out of alignment. The scale 51 can be calibrated in any suitable intervals in order to measure or indicate the degree of misalignment of the axle. Although the amplitude of motion of the pointed end of the pointer under the conditions illustrated greatly exceeds the actual extent of misalignment of the axle, the scale can be calibrated in such a way that by a direct reading the mechanic can determine substantially how great the correction need be in order to bring the wheel axles in true alignment.

It is preferable to have the pointers 49 as long as possible while at the same time preserving a sufficiently rugged structure. The mechanical amplitude of movement needed, however, for easy reading is more readily obtained by having the pointers extend well toward a point midway between the ends of the beam 30, at which point the pointed ends of the pointers on opposite ends of the beam will lie immediately adjacent each other and more readily indicate the degree of divergence of one axle or the other or both from an endwise alignment. In point of fact, the full amplitude of swing of the pointer is not sufficiently great to move it off the scale for ordinary amounts of misalignment. For the same reason the space 47 within the extension need not be great in order to readily accommodate the full amplitude of movement of the pointer block as it moves with the rotation of the post 37.

Although the gage is shown set up for measurement and reading on the underside of the vehicle, it may be set up with equal facility so as to be applied at the front of the vehicle should application in that position make for easier reading and a more precise detection of misalignment of the axles. For the same reason the gage may be moved freely in a circumferential direction about the axles, being limited only by the presence of other structure around the motor vehicle being serviced which, it is believed, is not material to the present disclosure. Moreover, inasmuch as the gage has relatively few parts and presumably only essential parts and since these parts are relatively light in weight, the weight of the gage as a whole may be held to a minimum which becomes of importance in providing an instrument which is not only inexpensive to manufacture but also one which is easy to handle with accuracy.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A portable axle alignment gage for axles on opposite sides of a motor vehicle comprising a beam having a non-circular cross-sectional shape adapted to extend past wheel positions on opposite sides of the vehicle, a transverse extension at each end of the beam having an aperture in one end corresponding in shape to the cross-sectional shape of the beam and having an endwise slidable adjustment on the beam, a swivel post rotatably mounted in each extension, a movable axle-engaging member mounted at the free end of the post and a gage connection element at another end of the post, said extension having an opening at the gage connection element, a pointer block non-rotatably fixed on the post at said gage connection element and adapted to swing within said opening, a pointer on each said block having a free end extending to a location intermediate the ends of the beam, and scales fixed in positions relative to the beam and the extensions adapted to cooperate with the free ends of the pointers to measure the alignment of the axles.

2. An axle alignment gage for independently mounted axles of motor vehicles comprising a beam having a rectangular cross-sectional shape adapted to extend outwardly beyond wheel positions on opposite sides of the vehicle, a transverse extension non-rotatably mounted at each end of the beam having a substantially rectangular aperture therein surrounding the beam and an endwise slidable adjustment on the beam, a tightener between the extension and the beam for holding the extension on the beam in adjusted position, a straight swivel post rotatably mounted in each extension on one side only of the beam, each said swivel post having an axle-engaging fork tiltably mounted at the free end on an axis of rotation transverse relative to the post and a gage connection element at the other end of the post, said extension having a lateral opening therein at the gage connection element, a pointer block non-rotatably fixed on said gage connection element and adapted to swing with the post within said lateral opening, a pointer on said block having a free end extending to a location intermediate the ends of the beam, and scales fixed in position upon and carried by the extension adapted to cooperate with the free ends of the pointers to measure the alignment of the axles.

3. An axle alignment gage for axles of a motor vehicle comprising a beam of non-circular cross-sectional shape adapted to extend laterally across the vehicle, transverse extensions mounted in endwise sliding relationship on the ends of the beam having axle-engaging posts thereon and self-adjusting axle-receiving forks at the ends of the posts, said posts being rotatably mounted on the respective extension, a pointer block member fixed upon each axle-engaging post intermediate the beam and the fork, an indicator scale arm mounted upon the extension and extending inwardly of the beam, an indicator scale on the arm, a pointer member associated with the indicator scale adapted to measure the alignment of the respective axle, a swivel connection between the other end of the pointer member and the pointer block member and means for zeroizing said pointer member relative to the respective axle-engaging post comprising an element on the pointer member including teeth and an element on the pointer block member including a worm wheel meshing with said teeth and manually adjustable means adapted to move said worm wheel relative to the teeth on the pointer member for zeroizing the adjustment of said pointer member relative to the respective axle-engaging post.

4. A portable axle alignment gage for axles of a motor vehicle comprising a beam adapted to extend laterally across the vehicle, transverse extensions mounted in the beam, axle-engaging posts mounted on the extensions, at least one of said posts being rotatably mounted relative to its extension, a self-adjusting axle-receiving fork on the free end of each post, said extension carrying the rotatable post having an aperture therein between the beam and the fork and opening toward the center of the beam, a pointer block member fixed upon the axle-engaging post within said aperture, a scale arm carried by the last-mentioned extension extending along the beam inwardly toward the center thereof and having a scale at the inner end, a pointer member associated with the scale adapted to measure the alignment of the respective axle, a pivotal connection between the other end of the pointer member and the pointer block member on an axis parallel to the axis of the post, said pivotal connection being adjacent to and outside said aperture, means for zeroizing said pointer member relative to the respective axle-engaging post comprising an element on one of said members and an element on the other of said members intermeshing with said first identified element and manually adjustable means adapted to move one of said last two elements relative to the other for zeroizing the adjustment of said respective pointer relative to the axle-engaging post.

FRANK ZENZ, Sr.

REFERENCES CITED

The following references are of record in the file of this patent:

UNITED STATES PATENTS

| Number | Name | Date |
| --- | --- | --- |
| 243,670 | Wills | June 28, 1881 |
| 337,606 | McQuarry | Mar. 9, 1886 |
| 605,863 | Dunigan | June 21, 1893 |
| 747,824 | Wilt | Dec. 22, 1903 |
| 1,396,477 | Turnbull | Nov. 8, 1921 |
| 1,476,904 | Malmquist | Dec. 11, 1923 |
| 1,535,574 | Campas | Apr. 28, 1925 |
| 1,883,197 | West | Oct. 18, 1932 |
| 2,133,827 | Miller | Oct. 18, 1938 |

FOREIGN PATENTS

| Number | Country | Date |
| --- | --- | --- |
| 331,974 | Germany | Jan. 17, 1921 |